(12) United States Patent
Bosse et al.

(10) Patent No.: US 11,782,815 B2
(45) Date of Patent: Oct. 10, 2023

(54) TOOL FOR OFFLINE PERCEPTION COMPONENT EVALUATION

(71) Applicant: Zoox, Inc., Foster City, CA (US)

(72) Inventors: Michael Carsten Bosse, Templeton, CA (US); Gerry Chen, Atlanta, GA (US); Subhasis Das, Menlo Park, CA (US); Francesco Papi, Sunnyvale, CA (US); Zachary Sun, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/581,699

(22) Filed: Jan. 21, 2022

(65) Prior Publication Data

US 2023/0251951 A1     Aug. 10, 2023

(51) Int. Cl.
| | |
|---|---|
| *G06F 11/36* | (2006.01) |
| *B60W 50/02* | (2012.01) |
| *B60W 50/04* | (2006.01) |
| *G06F 11/34* | (2006.01) |
| *B60W 40/04* | (2006.01) |

(52) U.S. Cl.
CPC ......... *G06F 11/3612* (2013.01); *B60W 40/04* (2013.01); *B60W 50/0205* (2013.01); *B60W 50/045* (2013.01); *G06F 11/3409* (2013.01); *B60W 2050/0215* (2013.01); *B60W 2554/4041* (2020.02); *B60W 2556/45* (2020.02)

(58) Field of Classification Search
CPC . G06F 11/3612; G06F 11/3409; B60W 40/04; B60W 50/0205; B60W 50/045; B60W 2050/0215; B60W 2554/4041; B60W 2556/45

USPC .......................................................... 701/104
See application file for complete search history.

(56) References Cited

U.S. PATENT DOCUMENTS

| | | | |
|---|---|---|---|
| 2019/0205218 A1* | 7/2019 | Bailey .................. | G06F 11/3013 |
| 2020/0151884 A1 | 5/2020 | Vajapey et al. | |
| 2021/0182911 A1 | 6/2021 | Xiao et al. | |
| 2021/0248399 A1 | 8/2021 | Martin et al. | |
| 2022/0001861 A1 | 1/2022 | Ersal et al. | |
| 2022/0188704 A1* | 6/2022 | Aguilar ...................... | G06F 9/48 |

FOREIGN PATENT DOCUMENTS

WO     2021037766 A1     3/2021

OTHER PUBLICATIONS

International Search Report and Written Opinion dated May 2, 2023, for International Application No. PCT/US2023/010305.

* cited by examiner

*Primary Examiner* — Scott A Reinbold
(74) *Attorney, Agent, or Firm* — EIP US LLP

(57) ABSTRACT

A computer-implemented method. Includes obtaining pointwise data indicating, for a plurality of time steps, a pointwise measurement of a state of an object detected by an object detection system. Includes obtaining, from a runtime model, runtime data indicating, for the plurality of time steps, a runtime estimate of the state of the object. Includes processing, by a benchmark model, the pointwise data to determine, for the plurality of time steps, a benchmark estimate of the state of the object. Includes evaluating a metric measuring, for the plurality of time steps, a deviation between the runtime estimate and the benchmark estimate of the state of the object. Includes updating, based on the on the evaluation of the metric, the runtime model.

19 Claims, 8 Drawing Sheets

TOOL FOR OFFLINE PERCEPTION COMPONENT EVALUATION

BACKGROUND

An autonomous vehicle typically includes a range of sensors and an onboard data processing system capable of detecting entities, such as other vehicles, in its vicinity, and estimating state variables associated with those entities, such as position, dimensions, orientation and velocity. By tracking an individual entity, information derived from earlier estimations of its state variables may be used to refine a current estimation of its state variables.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
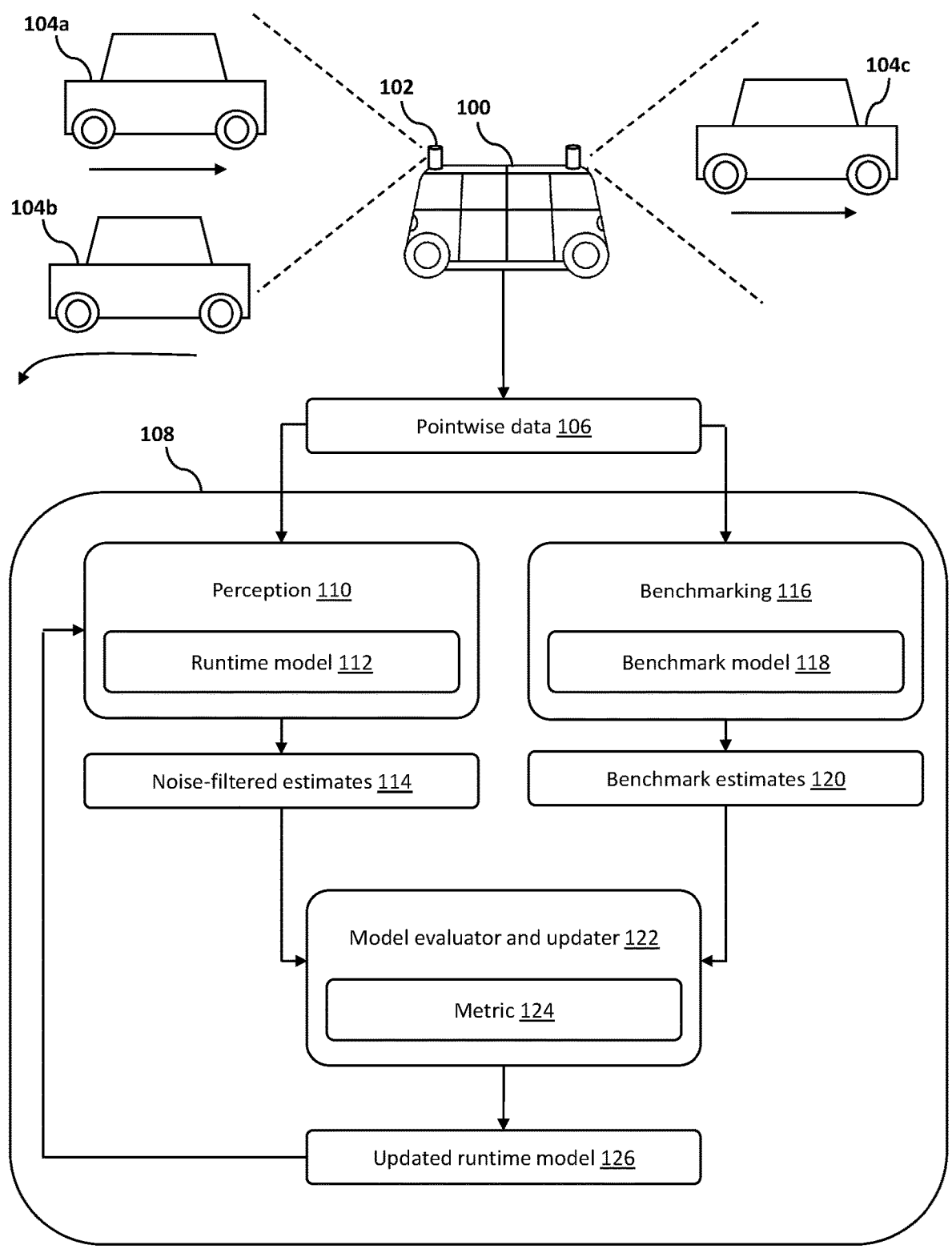
FIG. 1 is a schematic diagram of a system for benchmarking a runtime model for deployment on a vehicle.

The present disclosure relates to methods and systems for estimating states of entities, such as dynamic entities in a vicinity of an autonomous vehicle. In this context, dynamic entities (sometimes referred to as agents) may include vehicles or other objects capable of movement within an environment, and may be distinguished from static objects within the environment by virtue of their capability of movement. A state of an entity refers to one or more properties associated with the entity at a given point in time. The state may include dynamic properties which are expected to vary over time, including values of one or more kinematic variables such as the position and/or orientation of the entity, along with time derivatives of these quantities, such as velocity and/or rate of rotation. Alternatively, or additionally, the state of an entity may include static properties which are expected to remain constant over time, including geometric properties of the entity such as dimensions, extent, and/or shape of the entity. The state of an entity may be represented as vector with components representing respective state variables. In the context of an entity in the vicinity of an autonomous vehicle, the vector may for example represent planar (horizontal) position, planar velocity, yaw and yaw rate. Other variables may additionally, or alternatively, be included in the state, such as vertical position, pitch, or roll, along with their associated time derivatives.

An autonomous vehicle may include one or more sensors and an object detection system for detecting entities in the vicinity of the autonomous vehicle. The autonomous vehicle may further include an onboard perception component configured to estimate a state of a detected entity using sensor data collected from the one or more sensors at a given point in time or within a narrow temporal window (such as a few milliseconds) around a given point in time. An estimate of a state derived from data associated with a given point in time may be referred to as a pointwise measurement of the state.

A pointwise measurement of a state can be subject to various sources of error and noise, including observation noise caused by inherent uncertainties associated with the sensor(s), occlusion error caused by an entity being wholly or partly blocked from one or more sensors, and kinematic noise caused by unpredictable motion of the sensor(s) such as vibrations caused by an uneven road surface. The effect of such errors on a pointwise measurement of a state can be mitigated using information derived from estimates of one or more earlier states. In particular, by tracking an individual entity over time, a noise filter can be applied recursively to the pointwise measurements of the states of the entity at a series of time steps to determined runtime estimates of the states, which may mitigate at least some of the sources of error that can affect the pointwise measurements. In order to facilitate this, the onboard perception component of the autonomous vehicle may include a data association model to associate instances of entities detected at different time steps, along with a noise filter.

Prior to deployment of a data association model and/or a noise filter, values of associated parameters of the data association model and/or noise filter may be determined based on physical considerations (for example, based on kinematic equations of motion and/or known uncertainties associated with one or more sensors), or based on empirical data. For example, values of the associated parameters may be determined using online or offline machine learning methods. A difficulty of the latter approach is that ground truth states of entities observed in an environment are rarely available, except where simulations are used, but such simulations may not accurately represent the various sources of noise and errors present in a real physical environment. More generally, ground truth data can be difficult to obtain for machine learning tasks relevant to the control of an autonomous vehicle, due to the highly time-consuming and resource-intensive process of labelling data covering a sufficiently diverse range of scenarios.

In view of the above issues, the present disclosure provides an offline tool arranged to process pointwise measurements of states of entities detected over a period of time to determine offline estimates of the states of those entities. The offline estimates may be determined using an offline model and may more accurately represent the true states of the entities than the runtime estimates determined using the runtime model. The offline estimates may therefore be treated as pseudo-ground truth values of the states, in situations where a sufficient volume/diversity of ground truth data is not readily available.

In contrast with the runtime model, the offline model of the present disclosure may not be suitable for execution in an online setting, for example onboard an autonomous vehicle. In particular, to determine an offline estimate of a state of an entity at a given time step, the offline model may be configured to use information from time steps later than the given time step. This is in contrast with the runtime model, which may only use information from earlier time steps. A model that requires information from future time steps will necessarily operate with a temporal lag, and this may be undesirable in the context of a runtime model in an autonomous vehicle or other setting where decisions need to be made with minimal delay. Furthermore, execution of the offline model may require significantly more processing than execution of the runtime model, which may introduce an unacceptable level of lag and/or prevent the offline model from being executable in real time or near-real time. In some cases, the computational cost of executing the offline model may be prohibitively high for execution by a computer system onboard an autonomous vehicle.

Examples of noise filters suitable for implementation onboard an autonomous vehicle may include Kalman-type filters (such as a Kalman filter, extended Kalman filter, or unscented Kalman filter), though other filters such as particle filters and Gaussian process-based filters may be employed additionally or as an alternative. In this way, a pointwise measurement of a state may be refined based on information derived from the pointwise measurement of the previous state (and, optionally, one or more earlier states), resulting in various types of noise being filtered out from the measurement, providing that the noise can reasonably be modelled as uncorrelated from one time step to the next. Further refinement is possible using such a filter in combination with a robust loss function, which makes the output of the noise filter less sensitive to outliers.

In order for a noise filter to be applied to a given sequence of pointwise measurements, instances of entities detected at different time steps may first be associated with one or more "tracks" using a data association model, and the noise filter may be applied to instances associated with a common track. An entity associated with a track using the data association model may be referred to a track entity or a track object. The data association model aims to correctly associate instances of the same entity at different time steps with a common track. If an instance of an entity cannot be associated with an existing track (for example because the entity has only just come into range of the sensors and/or object detection system), then the data association model may create a new track, or may reject the instance as a false detection. In a multi-entity or multi-agent setting (as is typical in a driving environment), the data association task may not have a unique solution. For example, if an entity becomes occluded for one or more time steps, it may be difficult to determine whether a later detection corresponds to the same entity or an entirely new entity. In order to determine whether to associate an instance of an entity detected at a given time step with an existing track or whether to initiate a new track, the data association model may use estimates of states from previous time steps. For example, the mean and covariance of a noise-filtered estimate from a previous time step may be used to define a "gated" region of state space in which a new measurement may be determined to correspond to the same entity. Further criteria may be introduced to resolve ambiguities for example where multiple measurements appear in the gated region of state space. Such criteria may for example use classification and/or bounding box loss to resolve such ambiguities. Examples of data association models include network flow-based models, Markov Chain Monte Carlo (MCMC) data association, joint probabilistic data association, and multidimensional assignment.

As mentioned above, the combination of a data association model and a filtering model may be implemented in combination as a runtime (or "online") model, for example to be executed by computing hardware onboard an autonomous vehicle. The runtime model may be configured to processes pointwise measurements of states of entities detected in the vicinity of the autonomous vehicle to generate runtime estimates of the states of the entities, which may be used to predict trajectories of the entities and to plan which actions, if any, should be taken by the autonomous vehicle in dependence on the predicted trajectories of the entities. The runtime model thereby enables the autonomous vehicle to take actions which are less adversely affected by noise than if the pointwise measurements were used directly.

The performance of the data association model and the filtering model (collectively referred to as the runtime model) may be affected by values of a number of associated parameters. For example, the data association model may include parameters for controlling whether a new track is created for a given detection of an entity (as opposed to classifying as a false detection), and/or for controlling if a detected entity is associated with an existing track. The filtering model may include parameters characterizing various type(s) of noise/error associated with the pointwise measurements. In the case of a Kalman-type filter, a pointwise measurement $z_t$ of a state at a given time step t may be modelled as a noisy observation of the true state $x_t$ at that time step t such that $z_t=g(x_t)+v_t$, where g is a measurement operator and $v_t$ is a measurement noise which captures random errors associated with the measurement of the state. The state $x_t$ at time step t is assumed to be derivable from the state $x_{t-1}$ at a previous time step t−1 by application of a linear or nonlinear state transition operator f, such that the operator f represents the time evolution of the state. In some examples, at least some components of the state, such as the dimensions of the entity, are not expected to change over time, whereas other components, such as the position of the entity, may change over time. The time evolution of the state is assumed to be subject to state transition noise $w_t$ which captures random (uncorrelated) variations in the system dynamics, such that $x_t=f(x_{t-1})+w_t$. Depending on the filtering model, the operators f and/or g may each have known parametric forms (for example based on known equations of motion), in which case the parameters of the operators f and/or g may be parameters of the runtime model. Alternatively, the operators f and/or g may be modelled in a nonparametric fashion, for example being governed by latent Gaussian processes, in which case hyperparameters of the latent Gaussian processes may be parameters of the runtime model. The measurement noise $v_t$ and the state transition noise $w_t$ may be modelled as Gaussian noise parameterized by respective covariance matrices, in which case the entries of these covariance matrices may also be parameters of the runtime model.

The state transition operator f may depend on the classification of the entity, reflecting the fact that different entities may be subject to different dynamics. For example, a vehicle with four-wheel steering may be able to move in a direction that is different from the direction the vehicle is facing (e.g. drift), whereas a vehicle with two-wheel steering may only be able to move in the direction the vehicle is facing (unless conditions are identified which may cause the vehicle to lose traction with the road).

Whereas the runtime model described above may include a noise filter, the offline model of the present disclosure may include a smoother, such as a Rauch-Tung-Striebel (RTS) smoother, a two-filter smoother, a sequential importance resampling smoother, a Rao-Blackwellized particle smoother, or a grid-based smoother. For a given noise filter (such as a Kalman-type filter), an associated smoother may be constructed by applying recursion in a reverse temporal direction to update and improve estimates from the filtering model. In this way, using information from future time steps may drastically reduce the uncertainty of an estimate for a given time step. By incorporating information from future time steps, certain hypotheses regarding the state can be ruled out. The smoother may be a fixed-lag smoother configured to estimate the state of an entity a predetermined number of time steps before the latest available time step. Alternatively, the smoother may be a fixed-point smoother configured to estimate a state of the entity at a fixed time step, using the information from an increasing number of future time steps. Alternatively, the smoother may be a fixed-interval smoother configured to estimate states of an entity over a fixed interval, given pointwise measurements of the states of the entity over the same interval. The smoother may be an optimal smoother in the Bayesian sense (aka Bayes optimal), meaning that for a given filtering model the smoother may determine the most likely value of the state at each time step, given the information available to the smoother. Optimal smoothing equations are available for all Kalman-type filters, and may be evaluated using a series of recursive calculations in the reverse temporal direction. Effectively, a smoother may take information captured at a sequence of time steps and solve a Bayesian optimization problem to provide the most likely configuration of states over that sequence of time steps (in other words, the joint distribution of states having the highest likelihood). In an offline setting, parameters associated with the smoother (such as entries of the covariance matrices associated with the measurement noise $v_t$ and the state transition noise $w_t$) may be optimized or learned from the data, either for individual tracks or globally for all tracks in a given time frame, resulting in smoothed estimates of the states which may be Bayes optimal with respect to the chosen filtering model.

The smoother may be a Gaussian process-based smoother. A smoother of this kind may be associated with a Gaussian process-based filter and may not assume a parametric form of the underlying state transition operator f and measurement operator g, but instead may associate each of these operators with one or more Gaussian processes whose posterior distributions are determined using Bayesian inference. For certain Gaussian process models, exact inference may be performed, enabling a joint posterior distribution for the states and their uncertainties over a sequence of time steps to be determined in closed form. Alternatively, approximate inference may be used, for example using sampling techniques or sparse approximations of the underlying Gaussian processes. In either case, hyperparameters of the Gaussian processes may be optimized using maximum a posteriori (MAP) estimation, maximum likelihood estimation, evidence maximization, or sampling. Gaussian process inference, including hyperparameter optimization, may be highly computationally expensive and unsuitable for use in an online setting.

The offline model may include a multiple hypotheses batch tracking model. Over a sequence of time steps, a multiple hypotheses tracking model may be configured to construct and update so-called track trees encapsulating one or more tracking hypotheses. A track tree may have nodes corresponding to detections of one or more entities at each of a sequence of time steps, and branches that connect detections on hypothetical tracks (or trajectories) between time steps. At a given time step, a new track tree may be constructed for each entity detected at that time step, accounting for the possibility that the detection corresponds to a new entity coming into detection range. Existing track trees may also be updated with detections from the given time step. In particular, an existing track tree may be extended by appending as separate branches any new detections consistent with an existing node in the track tree. A new detection at a given time step may be considered to be consistent with an existing node in the track tree if the pointwise measurement of its state (or simply its position or another subset of state variables) is within a predetermined metric distance D (for example, a predetermined Mahalanobis distance) of the state (or subset of the state) predicted for that time step according to a filtering model applied at the existing node, or in other words if the measurement falls within a region of state space depending on the noise-filtered estimate of the state at the previous time step. An additional branch may be appended to the track tree to account for occlusion or an otherwise missing detection of an entity at a given time step.

Track trees may be pruned at some or all time steps according to one or more pruning criteria, and the track hypotheses remaining after pruning may be scored, for example in dependence on their Bayesian likelihoods as derived from the filtering model and/or other factors such as bounding box loss and/or classification loss. After pruning, the configuration of track hypotheses (i.e. global hypothesis) having a highest overall score may be determined by solving a discrete optimization problem (such as a maximum weighted independent set (MWIS) optimization problem), and the determined configuration may be identified as the correct global hypothesis at the given time step, such that each track in the identified global hypothesis may be determined to correspond to multiple instances of a common entity.

In an online setting, multiple hypotheses tracking models are constrained by the need to rapidly prune track trees to prevent exponential growth of the number of track hypotheses, as well as the fact that the model can only use information from previous time steps. Either or both of these constraints may result in the true track configuration being missed, particularly if parameters for the tracking model are not tuned correctly. Pruning may be performed using a range of techniques, for example N-scan pruning in which branches corresponding to the global hypothesis at time step k are traced backward to the corresponding nodes at time step k–N (for a predetermined parameter value N), and subtrees diverging from the from the global hypothesis at that node are removed. In this way, branches of a track tree which are distant from the global hypothesis are removed. In effect, ambiguities in data association up to time step k–N are resolved by looking ahead for a window of N frames. Other examples of pruning criteria include pruning track trees that have more than a predetermined value B of branches, for example by keeping only the B highest scoring branches. In an online setting, the values of the parameters D, B and/or N (and possibly other parameters depending on the data association model) may be chosen to satisfy a trade-off between accuracy and computational cost. For example, selecting larger values of D, B, and/or N reduces the probability of missing a true global hypothesis, but increases the computational cost and running time of the data association model. Therefore, online settings may be limited to using relatively small values for these parameters, which may limit the practicality of the multiple hypotheses tracking model for use in online settings.

In the present setting, the offline model may utilize a multiple hypothesis tracking model (or any other suitable type of tracking model) in an offline manner. As explained above, the offline model is not restricted to using information from past time steps, and temporal lag may not be a primary consideration as may be the case for an online model. The lifting of these restrictions may enable the use of parameter values which result in a highly accurate data association model (for example high values of D, B and/or N for the multiple hypotheses batch tracking model described above). Furthermore, the data association model may be run in forward and/or reverse temporal direction, which may further improve accuracy. In a particular example, a smoother (such as one of the smoothers discussed above) may be run for each candidate track at each time step, resulting in a more accurate estimate of the Bayesian likelihood and more accurate determination of the correct track configuration. In other examples, the offline model may forego the use of track trees entirely, and for example perform an exhaustive search over track configurations within a fixed temporal horizon. Although the number of track configurations may increase exponentially with the size of the temporal horizon, limiting the size of the temporal horizon may enable all track configurations to be considered in a reasonable timescale for the offline setting. In this example, a smoother may be applied to each track in each candidate track configuration, enabling an accurate Bayesian likelihood to be determined for each track for the purpose of data association. Such a method may be applied for example using a sliding temporal window.

By using a Bayes optimal smoother and an accurate data association model, such as a multiple hypotheses batch tracking model, the offline model may be capable of generating a globally Bayes optimal set of estimates of the states of entities detected in a given time frame. Such estimates may be treated as pseudo-ground truth values for the states, for example in settings when ground truth data is unavailable or insufficient for a given task.

To expand on the above, FIG. 1 illustrates an example in which an offline model as described above is used to generate pseudo-ground truth data for benchmarking a runtime model for deployment on an autonomous vehicle. FIG. 1 shows an autonomous vehicle 100 having an onboard perception component (not shown) configured to process data captured by onboard sensors 102 to detect and classify entities in the vicinity of the vehicle, and to estimate the states of the detected entities. In this example, three dynamic entities 104a, 104b, 104c (collectively referred to as entities 104) are detected in the vicinity of the vehicle 100 and classified as vehicles, and the onboard perception component determines pointwise measurements of the states of the entities 104 at a sequence of time steps for which the entities 104 are in range of the sensors 102 (including position, velocity, yaw and yaw rate, represented by the arrows below the entities 104). The onboard perception system is further configured to process the pointwise measurements using a runtime model as discussed above to determine runtime estimates of the states of the entities 104. These runtime estimates are passed to an onboard prediction component and an onboard planning component, which together determine actions to be performed by a drive system of the vehicle 100. It is to be noted that the onboard perception component is for determining states of objects or entities other than the vehicle 100. The vehicle 100 may further include a localization component, which by contrast is for determining a position and/or orientation of the vehicle 100 itself.

During operation, the onboard perception component of the vehicle 100 can generate pointwise data 106 indicating the pointwise measurements of the states of the entities 104 at different time steps. The pointwise data 106 may further include metadata relevant to the downstream processing of the pointwise measurements, such as timestamps and classifications for the entities 104. The pointwise data 106 may be stored in any suitable format by one or more memory devices onboard the vehicle 100, for example in log files and/or relational databases. Optionally, the unprocessed sensor data from which the pointwise measurements are derived may also be stored in association with the pointwise data 106. In the present example, the vehicle 100 provides the pointwise data 106 to a remote system 108, for example by transmission over a network (not shown) using wired and/or wireless communication means. The pointwise data 106 may be provided to the remote system 108 in a streaming fashion or in batches, either periodically (such as every hour, day, week etc.) or when certain conditions are satisfied, such as when a suitable wired or wireless connection to the network is available and/or when a certain volume of pointwise data 106 has been generated. The vehicle 100 may additionally or alternatively provide the unprocessed sensor data, and/or the runtime estimates determined using the runtime model, to the remote system 108.

The remote system 108 includes an offline perception component 110, which has similar functionality to the onboard perception component of the vehicle 100. The offline perception component 110 includes a runtime model 112. Although the runtime model 112 is stored and executed on the remote system 108, the runtime model 112 may be suitable to be stored and executed onboard a vehicle such as the autonomous vehicle 100. The runtime model 112 may be an instance of the same runtime model stored onboard the vehicle 100, or may differ from the runtime model stored onboard the vehicle 100, for example by having different parameter values and/or by implementing a different data association model and/or filtering model.

The offline perception component 110 may be configured to process the pointwise data 106 received from the vehicle 100, along with pointwise data received from (possibly many) other vehicles, using the runtime model 112, to generate runtime estimates 114 of the states of entities detected by those vehicles. The runtime model 112 may be configured to associate a given instance of an entity detected at a given time step with a further instance detected at an earlier time step, in accordance with a data association model. The runtime model 112 may be configured to filter the pointwise measurement of the state associated with the given instance in dependence on a runtime estimate of the state associated with the further instance at the earlier time step, in accordance with a filtering model. In this way, the runtime model iteratively generates the runtime estimates 114 of the states of detected entities, using information which is available in a runtime setting (i.e. without using information from future time steps). It is to be noted that in some examples, the offline perception component 110 may be omitted and the runtime estimates 114 may be received directly from one or more vehicles with perception components running instances of a common runtime model.

The remote system 108 further includes a benchmarking component 116. The benchmarking component 116 may be configured to process the pointwise data 106 received from the vehicle 100, along with pointwise data received from (possibly many) other vehicles, using a benchmark model 118, to generate benchmark estimates 120 of the states of entities detected by those vehicles. The benchmark model 118 may include an offline data association model and a smoother, for example as described above, and accordingly may be capable of generating more accurate estimates of the states of entities than the runtime model 112. In particular, the benchmark model 118 may use information from future time steps to determine a benchmark estimate at a given time step. Furthermore, in some cases the benchmark model 118 may arrive at a different track hypothesis to the runtime model 112, as illustrated in an example below.

Figure 4:
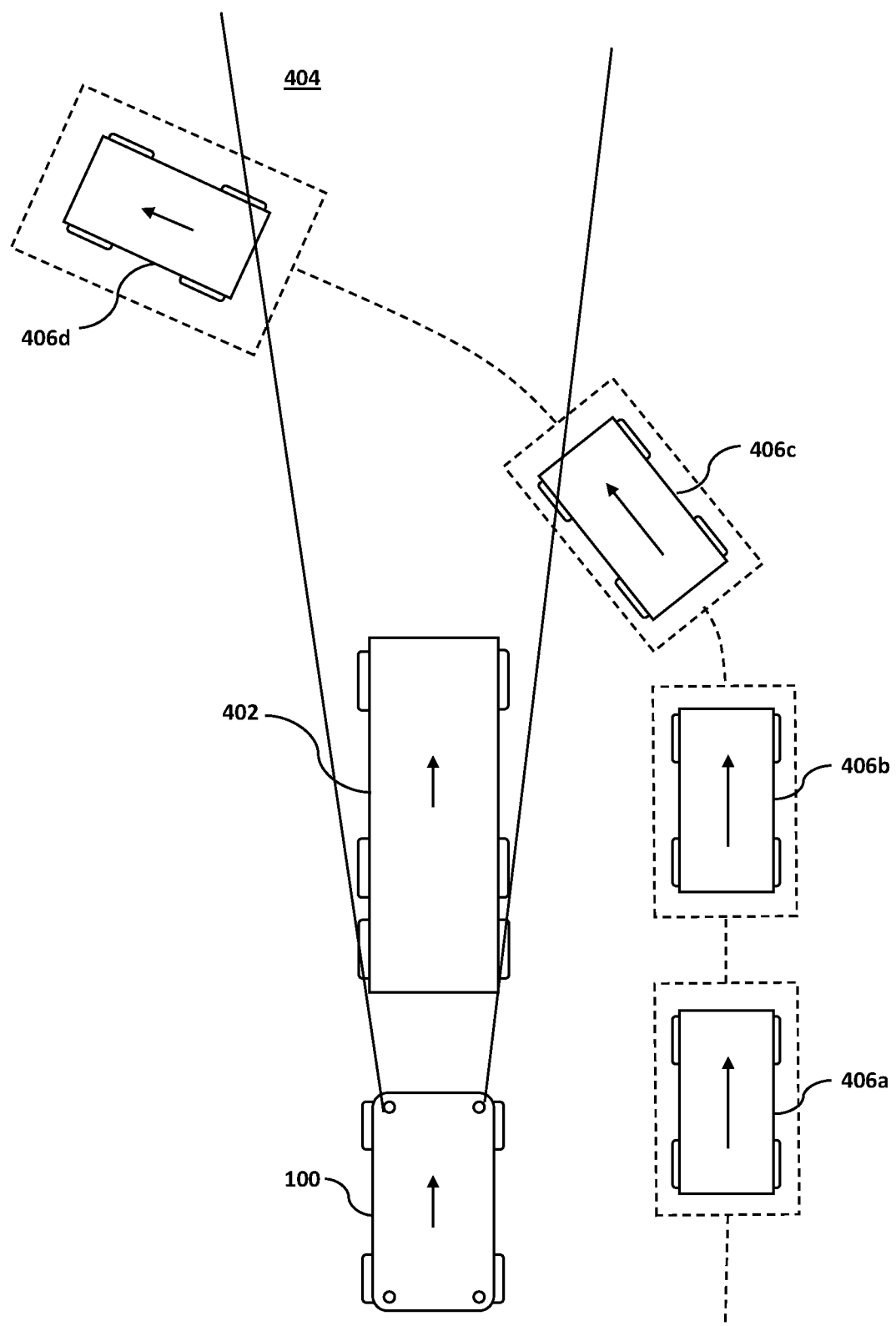
FIG. 4 illustrates a first tracking hypothesis for entities in a vicinity of an autonomous vehicle.

FIG. 4 shows a top-down view of a scene involving the autonomous vehicle 100. In this scene, the autonomous vehicle 100 is driving behind a bus 402 such that there is an occluded region 404 of the scene which is hidden from at least some of the sensors on the vehicle 100 (as shown between the solid lines in FIG. 4). Using the sensors 102 and the onboard data processing system, the autonomous vehicle 100 detects instances of an entity classified as a "car" a set of time steps $t_a$, $t_b$, $t_c$, $t_d$ (whose positions relative to the autonomous vehicle 100 are simultaneously shown in FIG. 4 as instances 406a, 406b, 406c, 406d, 406e). in this example, the interval between each pair of adjacent times steps is equal, apart from the interval between $t_c$ and $t_d$, which is twice as long as there was no detection of an entity (other than the bus 402) at an intervening time step. At each of the time steps $t_a$, $t_b$, $t_c$, $t_d$, the autonomous vehicle 100 determines a pointwise measurement of the state associated with the instance detected at that time step. Pointwise data 106 indicating the pointwise measurements at time steps $t_a$, $t_b$, $t_c$, $t_d$ are transmitted to the remote system 108.

The offline perception component 110 processes the pointwise data 106 using the runtime model 112 to determine runtime estimates of the states associated with the instances 406a, 406b, 406c, 406d detected at the time steps $t_a$, $t_b$, $t_c$, $t_d$. As explained above, the runtime model 112 includes a data association model and a filtering model. In this example, the data association model associates each of the instances 406a, 406b, 406c, 406d with a common track (as indicated by dashed curves), corresponding to the hypothesis that all of the instances 406a, 406b, 406c, 406d are instances of the same car. The uncertainty in the filtered estimates of the states are represented by the dashed bounding boxes around the instances 406a, 406b, 406c, 406d. It is observed that the uncertainty in the states associated with the instances 406a, 406b, 406c is relatively low, whereas the uncertainty in the state associated with the instance 406d is higher, because a greater interval has elapsed since the previous time step and uncertainty under the filtering model grows with time between measurements.

Figure 5:
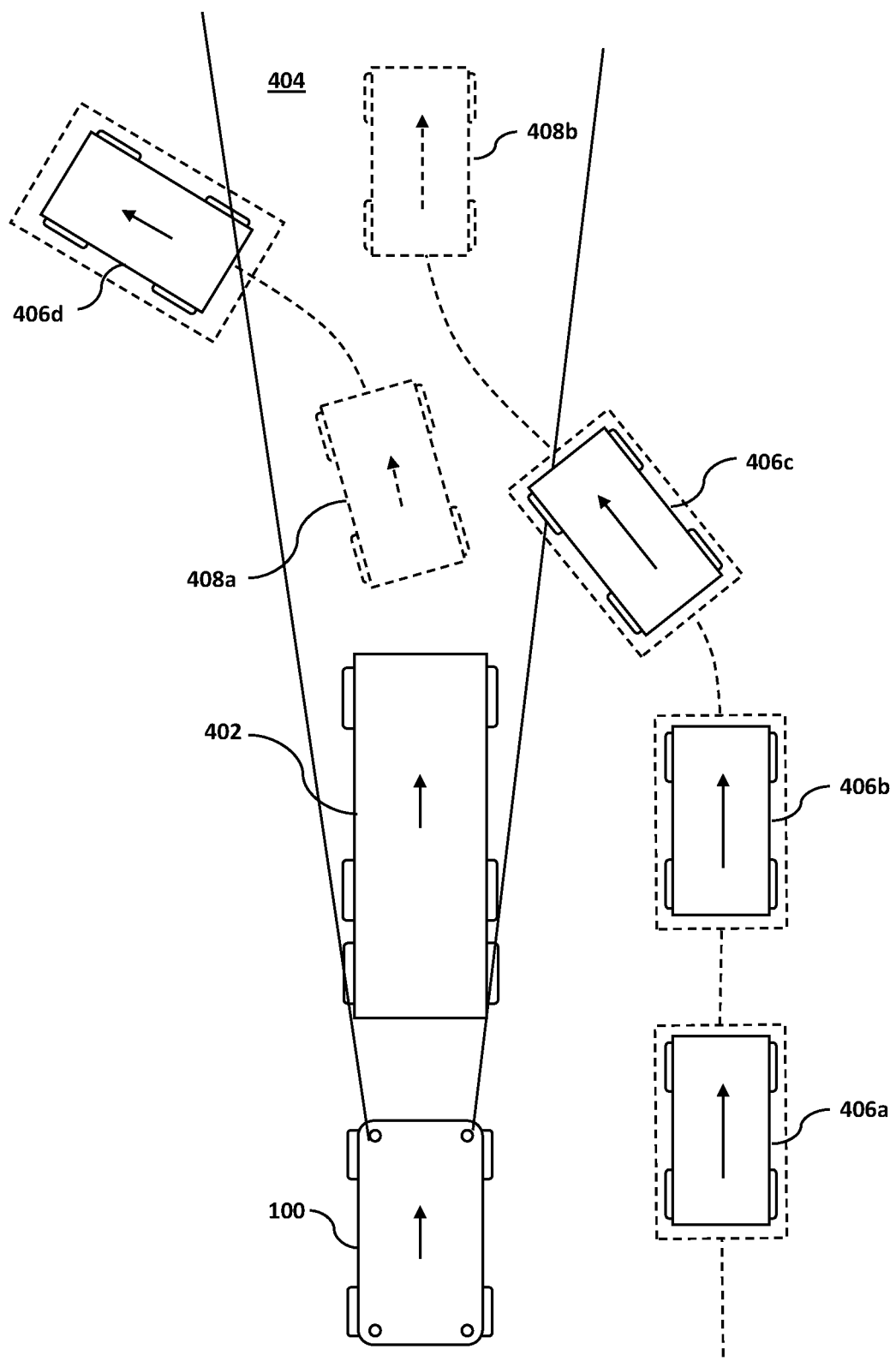
FIG. 5 illustrates a second tracking hypothesis for entities in a vicinity of an autonomous vehicle.

The benchmarking component 116 processes the pointwise data 106 using the benchmark model 118 to determine benchmark estimates of the states associated with the instances 406a, 406b, 406c, 406d detected at the time steps $t_a$, $t_b$, $t_c$, $t_d$. As shown in FIG. 5, the benchmark model associates each of the instances 406a, 406b, 406c with a common track, but initiates a new track for the instance 406d, corresponding to the hypothesis that the instance 406d is a different car to the instances 406a, 406b, 406c. In this case, the hypothesis of the benchmark model 118 corresponds to the ground truth, whereas the hypothesis of the runtime model 112 is incorrect (dashed instances 408a, 408b show the ground truth positions of the two cars at time steps when the two cars are occluded). It is further observed that the uncertainties in the states associated with the instances are consistently lower for the benchmark model 118 than for the runtime model 112, even for the instance 406d for which a new track is initiated. The benchmark model 118 is able to correctly resolve tracking ambiguities, and to determine more accurate estimates of states, at least in part because the benchmark model 118 is able to leverage information from future time steps, whereas the runtime model is constrained to using information from past time steps. The benchmark model 118 may further use a different data association model to the runtime model 112.

The offline perception component 110 and the benchmarking component 116 may send the runtime estimates 114 and the benchmark estimates 120 to a model evaluator and updater 122, optionally with similar data generated from other sources (such as many other autonomous vehicles). The model evaluator and updater 122 is configured to process the runtime estimates 114 and the benchmark estimates 120 to generate data corresponding to an updated runtime model 126. In particular, the model evaluator and updater 122 may be configured to evaluate a metric 124 measuring a deviation between the runtime estimates 114 and the corresponding benchmark estimates 120 and to update the runtime model 112 in dependence on the evaluation of the metric. By treating the benchmark estimates 120 as pseudo-ground truth, the metric 124 may be used to measure the performance of the runtime model 112. The performance of the runtime model 112 may be affected by various factors, as described below, and therefore the benchmarking component 116 and the model evaluator and updater 122 may be run separately for different sets of pointwise data 106, resulting in multiple versions of the updated runtime model 126.

The runtime model 112 may perform differently in different environmental conditions, for example at different times of day (corresponding to different lighting conditions), in different driving environments (such as urban environments or countryside environments), and/or in different weather conditions. The components of the remote system 108 may therefore be run separately using pointwise data 106 for respective different environmental conditions to generate respective different updated runtime models 126 appropriate for the different environmental conditions. For example, in dark or snowy conditions the measurement noise may be greater, and it may be more difficult for the runtime model 112 to associate an object instance with a given track, in which case different thresholds for object association may be appropriate.

The runtime model 112 may perform differently when used with different perception components or different versions of a perception component. The components of the remote system 108 may be therefore be run separately using pointwise data 106 generated by different perception components or different versions of a perception component, resulting in different updated runtime models 126 appropriate for the respective different perception components of different versions of a perception component. For example, different values of the measurement noise and thresholds for object association may be appropriate depending on the accuracy of the object detection model used in generating the pointwise data 106.

The metric 124 may measure a pairwise deviation between runtime estimates and benchmark estimates of a state. For example, the metric 124 may depend on a metric distance between a runtime estimate of a state of an entity detected at a given time step and a benchmark estimate of the state of the entity. The metric 124 may for example be a function of the L1 loss, the smoothed L1 loss, the L2 loss, or any other suitable pairwise distance measure. By summing or otherwise combining these losses over multiple detections within a given time period, the metric 124 may measure the performance of the runtime model 112 over that time period. The metric 124 may additionally or alternatively measure a pairwise deviation between uncertainty estimates between runtime estimates and benchmark estimates of a state. For example, for each detection at each time step, a Kalman-type filter (and corresponding smoother) may generate an a posteriori covariance matrix for the state, which may be considered an estimate of the predicted accuracy of the runtime estimate of the state. The metric 124 may then depend on a metric distance between the a posteriori covariance of a runtime estimate and the a posteriori covariance of a corresponding benchmark estimate. By measuring the deviation between the state estimates and the associated uncertainty estimates, the metric 124 may measure the efficacy of the runtime model 112 at filtering out noise in state measurements and also in estimating how much confidence can be attributed to the resulting estimates. In safety-critical environments, such as driving environments, it is important for uncertainty to be quantified as certain actions should only be taken if there is sufficient confidence in the perception of the environment.

As an alternative to measuring pairwise deviations, the metric 124 may measure a deviation between joint probability distributions of the runtime estimates 114 and the benchmark estimates 120. For example, the metric 124 may depend on a Kullback-Leibler (KL) divergence of a first probability distribution from a second probability distribution, where the first (or second) probability distribution may be the joint probability distribution of runtime estimates (as defined by the runtime estimates and their corresponding posterior covariances), and the second (or first) probability distribution may be the joint probability distribution of the corresponding benchmark estimates. The joint distributions may be taken over multiple detections, optionally over multiple time steps, for example within a given time frame.

As explained above, the runtime model 112 may perform data association less accurately than the benchmark model 118. A metric 124 which measures the deviation between the runtime estimates 114 and the benchmark estimates 120, and optionally their corresponding uncertainty estimates, may automatically capture situations where tracking predictions diverge between the runtime model 112 and the benchmark model 118, because different tracking predictions will result in the noise filtering using information from different earlier states. In the example of FIG. 4, the runtime estimate of the state associated with the instance 406d is derived from the runtime estimate of the state associated with the instance 406c. By contrast, the benchmark estimate of the state associated with the instance 406d is independent of the state associated with the instance 406c. Even if the filtering model is highly accurate, these differing tracking predictions would likely result in differences between the runtime estimates and the benchmark estimates. In this way, the metric 124 may capture deviations between the two data association models in the case of tracking ambiguities. In other cases, it may be preferable for the metric 124 to compare runtime estimates and benchmark estimates only for instances where the same tracking predictions are made. In this way, the metric 124 may measure the accuracy of the filtering model, as opposed to the combined effect of the data association model and the filtering model.

In addition to, or instead of, measuring the deviation between estimates of states, the metric 124 may explicitly measure deviations between tracking predictions made by the runtime model 112 and the benchmark model 118. For example, the metric 124 may count how many times the runtime model 112 and the benchmark model 118 branch from one another within a given time frame. Alternatively, the data association problem for a given time step may be viewed as a classification problem, for example where each detected instance is classified either as a new entity, a false detection, or an entity which has been seen at a previous time step, in which case the metric 124 may measure precision and recall for this classification problem (treating the output of the benchmark model 118 as ground truth). Alternatively, the metric 124 may measure precision and recall in relation to the cardinality of the set of entities (i.e. the number of entities estimated to be present) over one or more time steps.

The model evaluator and updater 122 is configured to generate data corresponding to an updated runtime model 126 in dependence on the evaluation of the metric 124. The updated runtime model 126 may depend on evaluations of the metric 124 aggregated over multiple sources of data, for example multiple autonomous vehicles including the vehicle 100. The model evaluator and updater 122 may for example determine, based on the evaluation of the metric 124, that one or more aspects of the performance of the runtime model 112 differ from those of the benchmark model 120 by more than a threshold amount, and therefore that the runtime model 112 should be updated. The model evaluator and updater 122 may determine that the data association portion of the runtime model 112 needs to be updated, and/or that the filtering portion of the runtime model 112 needs to be updated. The model evaluator and updater 122 may update the indicated aspect(s) of the runtime model 112. The updated runtime model 126 may then be evaluated against the benchmark model 118 to determine whether the update was effective at improving the runtime model 112. The updating of the runtime model 112 may include, for example, replacing the data association model and/or the filtering model with a different data association model and/or filtering model.

The updating of the runtime model 112 may involve updating values of one or more parameters associated with the data association model and/or filtering model. The updating may involve sampling new values for the one or more parameters, using a sampling technique such as random search, grid search, or MCMC sampling. The sampling may be performed iteratively in a manner to optimize the values of the one or more parameters with respect to the evaluation of the metric 124. For example, the updating may use MCMC sampling in which the sampling distribution is conditioned on the evaluation of the metric 124. In some examples, Bayesian optimization may be performed, which provides a principled framework for dealing with the exploration/exploitation dilemma encountered when optimizing parameter values. Suitable Bayesian optimization methods may adopt a surrogate function such as a Gaussian process, Bayesian neural network, or other stochastic function or process for predicting the evaluation of the metric 124 for a given set of parameter values, then derive an acquisition function from this surrogate function, for example based on entropy search or expected improvement, and parameter values may then be sampled on the basis of the acquisition function. The acquisition function may be arranged to automatically balance exploration and exploitation (e.g. moving from exploration in the early stages of experimentation towards exploitation in the later stages of experimentation). In other examples, the sampling of parameter values may be performed by a reinforcement learning agent.

Alternatively, or additionally, values of one or more parameters of the runtime model 112 may be optimized using gradient-based optimization, for example using stochastic gradient descent or any of its variants. Gradient-based optimization may be a suitable for situations where the metric 124 is differentiable with respect to one or more parameters of the runtime model 112.

In some examples, the remote system 108 may have access to ground truth data for tracking and/or states of detected entities. In this case, the model updater 122 may further use the ground truth data for updating the runtime model 112. For example, the model updater 122 may measure the accuracy of the benchmark model 118 and the accuracy of the runtime model 112 using the ground truth data, enabling the model updater 112 to determine whether inaccuracies in tracking decisions and/or runtime estimates of the states determined by the runtime model 112 are caused by deficiencies in the runtime model 112 (in which case the runtime model 112 is expected to perform significantly worse than the benchmark model 118) and/or inaccuracies in the pointwise data 106 (in which case the output of the benchmark model 118 is expected to differ significantly from the ground truth).

Figure 6:
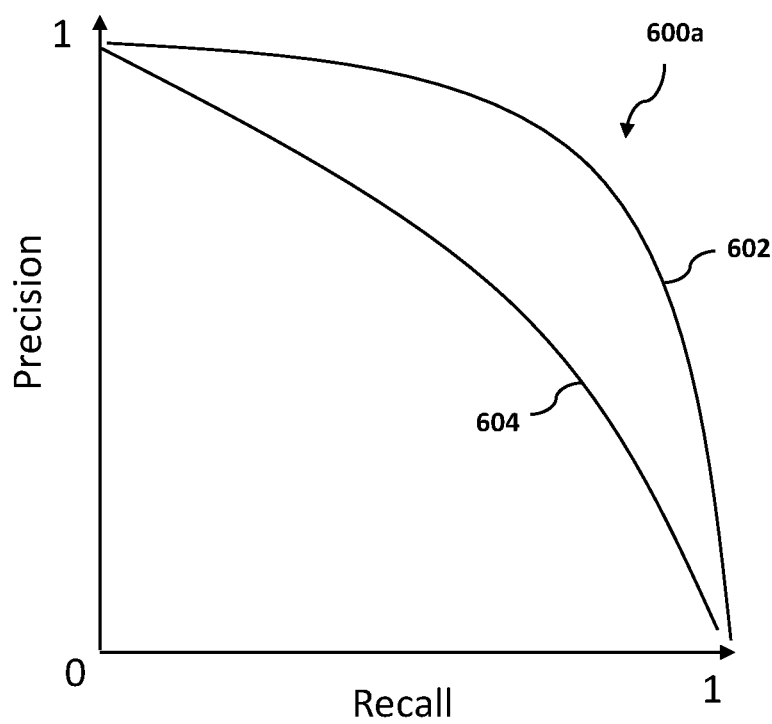
FIG. 6 depicts precision and recall curves for a runtime model and a benchmark model before and after the inference system is updated in accordance with examples.
Figure 6:
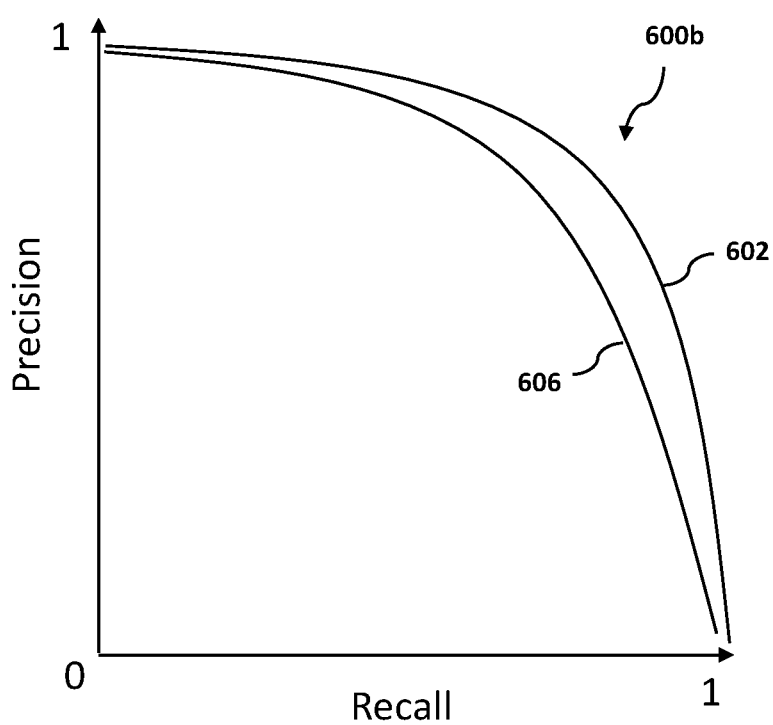

In the example of FIG. 6, the upper frame 600a shows a first precision and recall curve 602 and a second precision and recall curve 604 for the task of estimating cardinality, where the first curve 602 corresponds to the benchmark model 118 and the second curve 604 corresponds to the runtime model 112. For both models, the precision and recall are measured against the ground truth and aggregated from multiple data sources. It is observed that the area under the second curve 604 is significantly lower than the area under the first curve 602, indicating that the benchmark model 118 outperforms the runtime model 112 in this task. In this example, the model updater 122 updates parameter values of the runtime model 112 in dependence on a comparison between the first precision and recall curve 602 and the second precision and recall curve 604. For example, the model updater 112 may perform MCMC sampling, where the sampling distribution is conditioned on a difference between the first precision and recall curve 602 and the second precision and recall curve 604, for example a difference between the areas of the curves. The lower frame 600b of FIG. 6 shows the first precision and recall curve 602 and a third precision and recall curve 606, where the third curve 606 corresponds to the updated runtime model 112. It is observed that the third curve 606 is closer than the second curve 604 to the first curve 602, indicating that the runtime model 112 has improved as a result of the updating.

Although the system 108 is described above as being remote from the vehicle 100, in other examples a vehicle may have an onboard component for implementing the benchmark model and for generating update data for updating the runtime model on the vehicle. This may enable a vehicle to adapt its own runtime model based on data generated in its own environment, though may not benefit from data generated by other vehicles.

Figure 7:
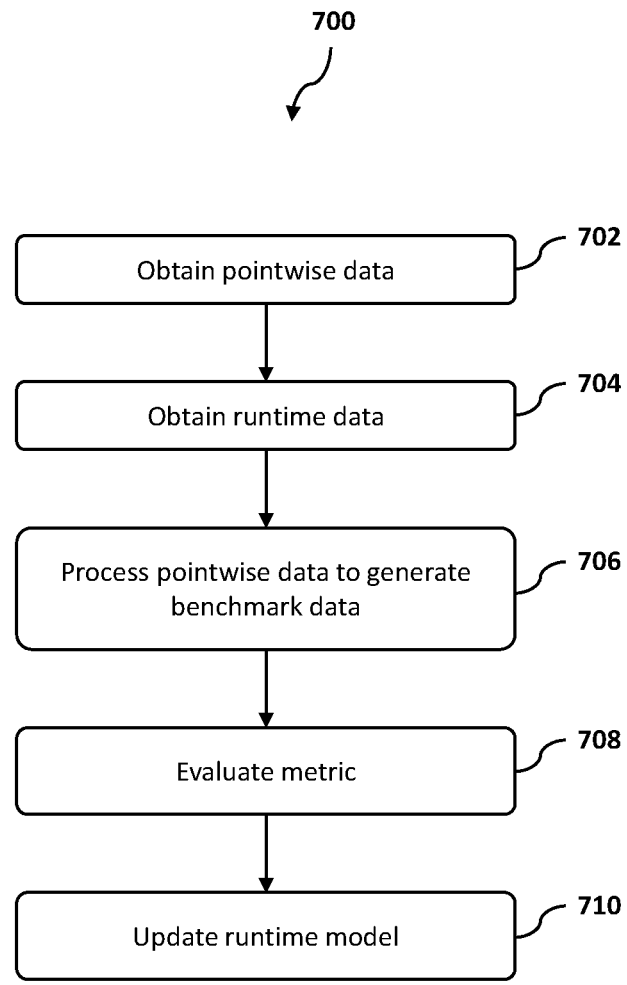
FIG. 7 depicts a flowchart representing a method of benchmarking a runtime model, in accordance with examples.

FIG. 7 shows an example of a computer-implemented method 700, which may be implemented by a computing system such as the remote system 108 of FIG. 1. The method 700 includes obtaining, at 702, pointwise data indicating, for a plurality of time steps, a pointwise measurement of a state of an object detected by an object detection system. The object may for example be an object in a vicinity of an autonomous vehicle or other type of vehicle. The object detection system may be part of a perception component onboard the vehicle, in which case the pointwise data may be received from the perception component onboard the vehicle. Alternatively, the pointwise data may be determined remotely from the vehicle, for example by processing raw sensor data or log data received from the vehicle.

The method 700 proceeds by obtaining, at 704, runtime data indicating, for the plurality of time steps, a runtime estimate of the state of the object. The runtime data is generated by a runtime model, which may be implemented as part of a perception system onboard a vehicle, or may be implemented remotely from a vehicle. The runtime data may be generated by processing the pointwise data recursively, as described elsewhere in the present disclosure. The runtime model may for example include an online data association model and a filtering model.

The method 700 proceeds by processing, at 706, the pointwise data to determine, for the plurality of time steps, a benchmark estimate of the state of the object. The benchmark data is generated by a benchmark model, which may be an offline system remote from the source of the pointwise data. The benchmark model may include determining the benchmark estimate of the state of the object at a given time step based on the pointwise measurement of the state of the object at the given time step and at a plurality of further time steps, the plurality of further time steps including at least one time step later than the given time step. In this way at least, the benchmark model may contrast with the runtime model. The benchmark model may for example include an offline data association model and a smoother.

The method 700 proceeds by evaluating, at 708, a metric measuring, for the plurality of time steps, a deviation between the runtime estimate and the benchmark estimate of the state of the object.

The method 700 concludes by updating, at 710, the runtime model, based on the evaluation of the metric. The updated runtime model may optionally be used to generate further runtime data, such that the method 700 returns to 704 and continues iteratively until a stopping condition is satisfied, for example a convergence condition or a predetermined number of iterations having been performed.

Figure 2:
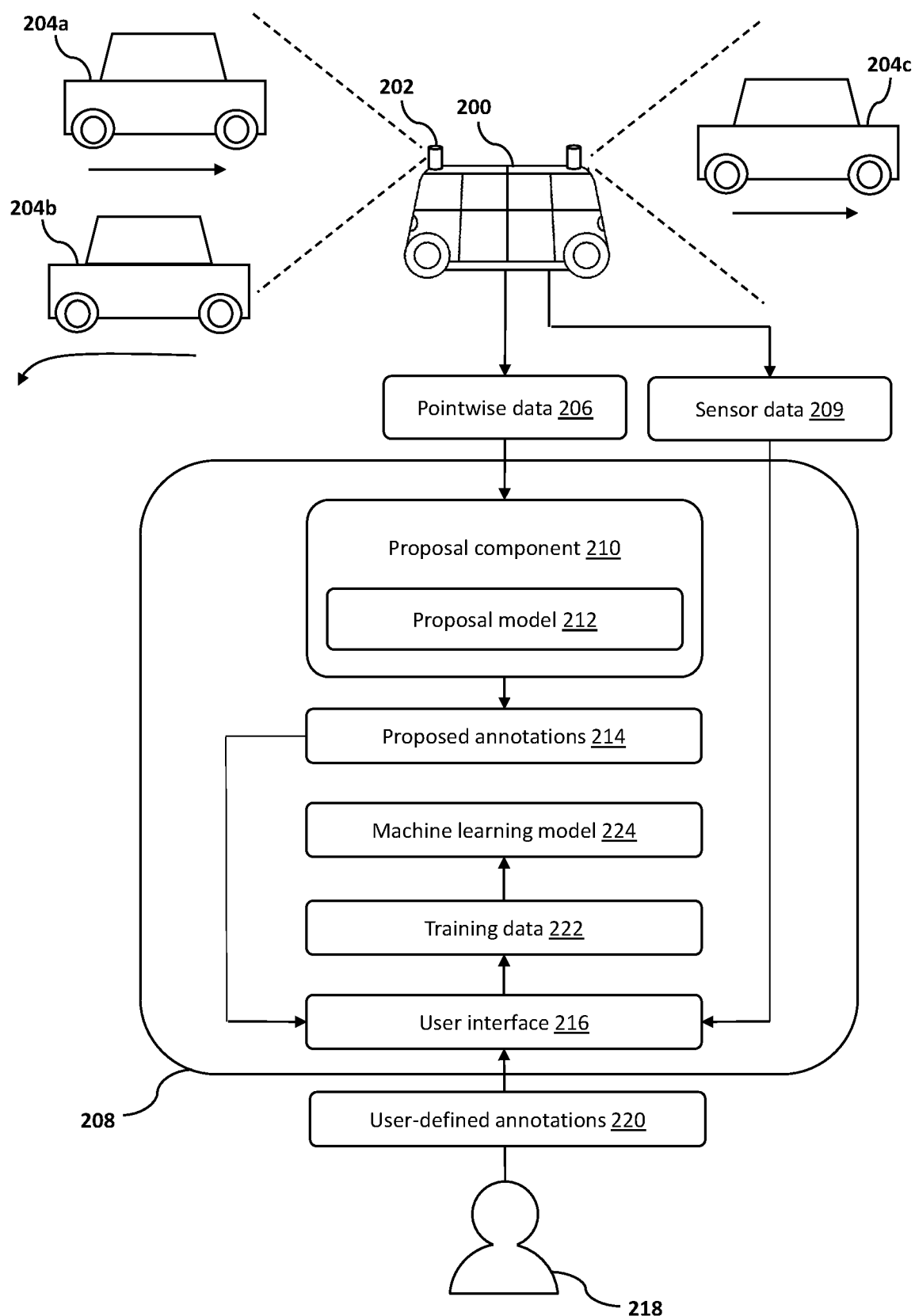
FIG. 2 is a schematic diagram of a system for assisted labelling of training data for a machine learning model.

As a further illustration, FIG. 2 shows an example in which an offline model as described above is used for assisted labelling of data, for example to be used as labelled training data for a machine learning model. Examples of techniques for assisted labelling of data can be found, for example, in U.S. patent application Ser. No. 17/538,909, filed Nov. 30, 2021, and titled "Generating and Training Object Detection Models for Autonomous Vehicles", the contents of which are incorporated by reference herein, in their entirety for all purposes.

FIG. 2 shows an autonomous vehicle 200 with sensors 202 for detecting and determining pointwise measurements of the states of dynamic entities, including vehicles 204a, 204b, 204c. The autonomous vehicle 200 in FIG. 2 may be functionally identical to the autonomous vehicle 100 in FIG. 1, and is similarly arranged to transmit pointwise data 206 to a remote system 208. The pointwise data 206 indicates pointwise measurements of the states of entities detected in the vicinity of the autonomous vehicle 200 at different time steps. In this example, the vehicle 200 further provides sensor data 209 captured by the onboard sensors 202 to the remote system 208. The sensor data 209 may be raw and/or processed sensor data and includes data from which a visual representation of the environment surrounding the vehicle 200 can be derived. Although in the present example the vehicle 200 provides the pointwise data 206 to the remote system 208, in other examples the remote system 208 may instead derive the pointwise data 206 from the sensor data 209.

The sensor data 209 may include sufficient input (test) data for a machine learning model (such as a neural network model) arranged to perform object detection and/or other tasks relevant to controlling an autonomous vehicle, including but not limited to semantic segmentation, instance segmentation, object classification, and object tracking.

Machine learning models for these purposes are typically trained using supervised learning based on labelled training data. The process of obtaining such labelled training data covering a sufficiently diverse range of scenarios can be highly time-consuming and resource-intensive and conventionally involves a human user manually applying labels or annotations. Labels are metadata associated with an input data item (such as an image) which may be compared with the output of a machine learning model during supervised learning. In this context, labels may include, for example, bounding boxes, bounding contours for semantic segmentation or instance segmentation, class labels, tracking predictions, and so on, for certain types of entities identified in the input data item.

To assist with the data labelling process, the remote system 208 includes a proposal component 210 configured to process the pointwise data 206 using a proposal model 212 to generate proposed annotations 214 for the sensor data 209. The proposal model 212 may include an offline data association model and a smoother, for example as described above, and accordingly may determine refined estimates of the states associated with instances detected at a given time step, based on accurate tracking predictions. The proposal model 212 may further include a trained machine learning model and/or heuristic model for performing a task such as object detection and/or other tasks relevant to controlling an autonomous vehicle. The proposed annotations 214 may depend on the tracking predictions and/or the refined estimates of the states. For example, the proposal model 212 may be arranged to determine a common class label for instances of entities associated with a common track, based on confidence levels associated with class labels for instances on the track. In this way, a common class label may propagate along the track, even where the confidence levels are low for some instances (for example in the case of partial occlusion). On the other hand, a change in class label on a predicted track may cause the proposal model 212 to re-evaluate the tracking prediction, as described above with regard to resolving tracking ambiguities. More generally, the proposal model 212 may be arranged to enforce or encourage continuity of proposed annotations on a given track, for example by ensuring that bounding boxes or bounding contours associated with different instances of an entity do not imply a change in size or shape of the entity. In another example, the proposal model 212 may be arranged to determine a position and/or orientation of a detected instance, based on the refined estimates of the states associated with instances on the same track. This may enable, for example, accurate top-down bounding boxes to be determined for all instances on the track. In this way, the proposal model 212 may use information from multiple instances associated with a common track to determine proposed annotations which are accurate and robust against noise.

The remote system 208 includes a user interface 216, which may include a combination of hardware and software components to enable a user 218 to interact with the remote system 208. The user interface 216 may include one or more displays, one or more input devices, along with associated rendering software and drivers for these devices. The user interface 216 is arranged to render a visual representation of the environment derived from the sensor data 209, for example an image or video representing the environment at one or more time steps, to be viewed by a user 218. The visual representation may be an image-based representation based on image data captured by the sensors 202 (e.g., cameras). In other examples, the visual representation may include a non-image based visual representation, such as a visual representation of a lidar point cloud, a radar or sonar return signal, or the like. In some cases, the user interface 216 may present one or more visual representations based on a combination of different sensor modalities of the same environment, such as a visual image and a corresponding lidar point cloud, etc. The visual representation may be rendered from the perspective of the vehicle, and/or from various other angles, such as a top-down view of the environment.

The user interface 216 is further arranged to render a visual representation of one or more proposed annotations 214, for example overlaid on the visual representation of the environment. The visual representation of the proposed annotation(s) 214 may include one or more of a proposed bounding box, a proposed bounding contour for semantic segmentation or instance segmentation, and/or text or symbols indicating a proposed class label for an entity. The user interface 216 may further enable the user 218 to modify the proposed annotation(s) 214 or otherwise provide user-approved annotation(s) 220 using the one or more input devices, having been presented the proposed annotation(s) 214. For example, the user interface 216 may render a visual representation of a proposed class label for a detected object, and provide means for the user 218 to either approve the class label or reject the class label. In the case that the user 218 rejects the class label, the user interface 216 may present alternative class labels (for example, in order of decreasing confidence as determined by the proposal model 212). The user 218 may then select a user-approved class label from the list of alternative class labels. In another example, the user interface 216 may present multiple options for proposed annotation (for example, multiple proposed class labels), and may enable the user 216 to select one of the proposed annotations, in which case the selected annotation may become the user-approved annotation. In another example, the visual representation of the proposed annotation may include a proposed bounding box, for example a bounding box for an entity as viewed from the perspective of the vehicle 200, or a top-down bounding box (e.g. if the visual representation of the environment is a top-down representation). In case the user 218 determines that the proposal model 212 has inaccurately determined the size, shape, and/or location of the entity, the user interface 216 may allow the user to drag the corners of the bounding box to new positions, thereby to determine a user-approved bounding box to correspond more accurately to the boundaries of the entity. Alternatively, the user interface 216 may allow the user to draw or otherwise define a new user-approved bounding box, having viewed the proposed bounding box. In the case the user 218 determines that a proposed annotation corresponds to a false detection, the user interface 216 may enable the user to delete the proposed annotation.

In response to receiving a user-approved annotation which differs from a proposed annotation relating to the same instance of an entity, the proposal component 210 may be configured to update proposed annotations for one or more further instances detected at respective different time steps. For example, the user 218 may specify a class label for a given instance detected at a given time step. The given instance may be associated with a track having a sequence of further instances, in accordance with the data association model. The proposal component 210 may therefore update the proposed class label of any instances associated with the same track to match the class label specified by the user 218. The user 218 may subsequently be presented with a visual representation of the environment at a later or earlier time step, along with the updated proposed class label for instances on the track. The updating of proposed annotations in this way may be dependent on confidence values associated with the original and/or updated class label for the further instances. For example, if the original and updated class labels for one of the further instances are assigned similar confidence levels, the proposal component 210 may perform the update as described, whereas if the original class label has a significantly higher confidence level than the updated class label for the further instance, then the proposal component 210 may refrain from performing the update. The proposal component 210 may be configured to update bounding boxes, bounding contours, or other proposed annotations in a similar fashion. For example, if the user 218 modifies the size and/or shape of a bounding box or contour for a given instance, the proposal component 210 may modify the size and/or shape of a bounding box or contour commensurately for a further instance on the same track.

The user interface 216 may be arranged to present a video stream representation of the environment over a sequence of time steps, along with corresponding annotations. The user 218 may be provided with means to pause or rewind the video stream to a chosen time step in order to provide user-approved annotations for that time step. Once an annotation has been corrected at a given time step, the correction may propagate to other instances associated with the same track, as explained above, providing an intuitive and time-efficient method for the user to correct annotations over several time steps.

The remote system 208 generates labelled training data 222 based at least in part on the user-approved annotations 220 and the sensor data 209. The labelled training data 220 may further include proposed annotations 214 that have been explicitly or implicitly accepted by the user 218. The remote system 208 may use the labelled training data 222 for supervised training of a machine learning model 224. The machine learning model 224 may be suitable for use in controlling an autonomous vehicle, and may be the same or different to the machine learning model implemented by the proposal model 212 to generate the proposed annotations 214. The machine learning model 224 may for example be a runtime model suitable for usage onboard an autonomous vehicle. As an offline model, the proposal model 212 may be capable of performing a given task more accurately than the runtime machine learning model 224. The combination of proposed annotations 214 generated by the proposal model 212 and user-approved annotations 220 provided by the user 218 may therefore represent a sufficiently good approximation of ground truth data for effective training of the machine learning model 224.

The machine learning model 224 may be trained using labelled training data aggregated from multiple sources, for example based on sensor data received from many autonomous vehicles. Furthermore, the task of generating user-approved annotations may be shared between many users accessing the remote system 208, or using other systems, for example in exchange for financial remuneration. The methods and techniques described herein may vastly increase the speed and accuracy with which labelled training data can be generated.

Figure 8:
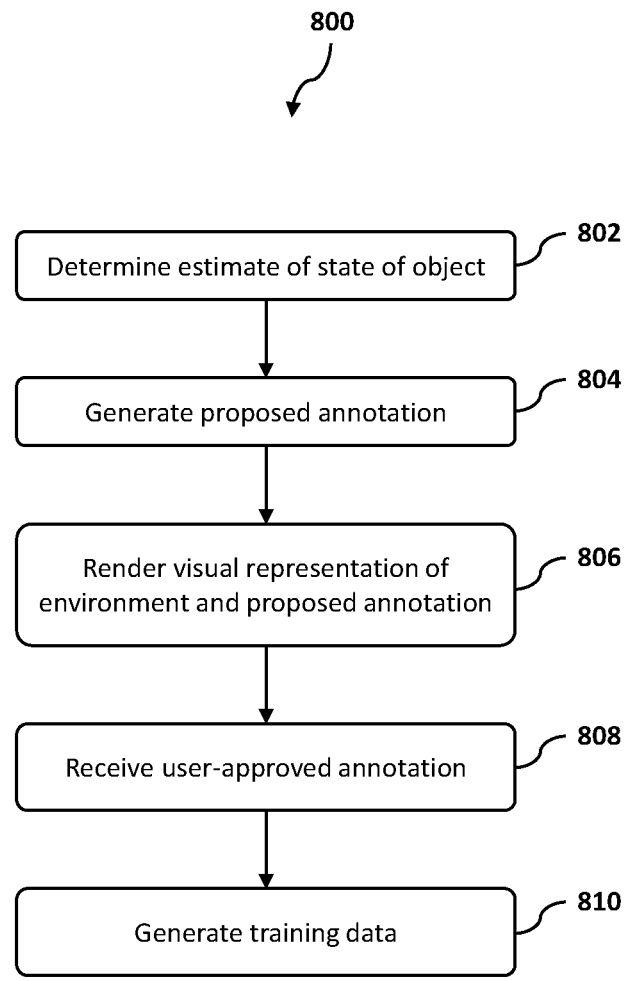
FIG. 8 depicts a flowchart representing a method of annotating data for training a machine learning model, in accordance with examples.

FIG. 8 shows an example of a computer-implemented method 800, which may be implemented by a computing system such as the remote system 208 of FIG. 2. The method 800 includes determining, at 802, an estimate of a state of an object at a first time step, based on a pointwise measurement of the state of the object at the first time step and pointwise measurements of the state of the object at a plurality of further time steps. The estimate of the state may be determined using an offline model as described herein, for example including a data association model and a smoother.

The method 800 proceeds by generating, at 804, a proposed annotation associated with the object at the first time step. The proposed annotation may be generated using the estimate of the state of the object determined at 802.

The method 800 proceeds by rendering, at 806, via a user interface, a visual representation of an environment containing the object at the first time step and a visual representation of the proposed annotation. The visual representation of the environment and the pointwise measurement of the state of the object at the first time step may derived from common sensor data.

The method 800 proceeds by receiving, at 808, user input via the user interface, user input indicating a user-approved annotation associated with the object at the first time step. As explained above, the user-approved annotation may be an approval or confirmation of the proposed annotation, or may be a modified annotation which differs from the proposed annotation.

The method 800 concludes by generating, at 810, training data for a machine learning model for use in controlling an autonomous vehicle, based at least in part on the user-approved annotation. The training data may include an input portion (such as an image) based on sensor data from which the pointwise measurement of the state of the object at the first time step is derived, and a label based on the user-approved annotation.

Figure 3:
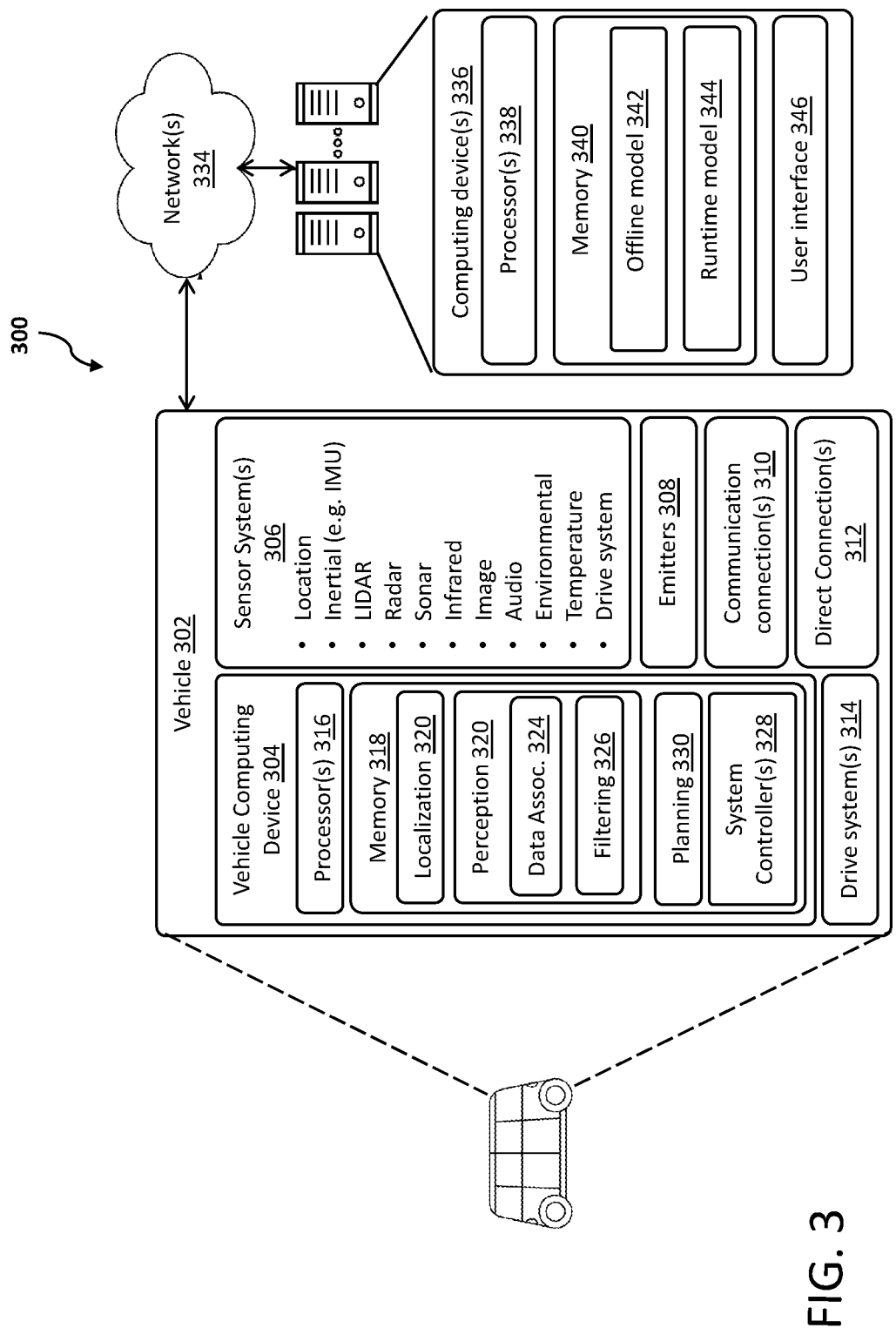
FIG. 3 depicts a block diagram of an example system for implementing the techniques described herein.

FIG. 3 depicts a block diagram of an example system 300 for implementing the techniques described herein. In some instances, the system 300 may include a vehicle 302, which may correspond to the vehicle 100 of FIG. 1, and/or the vehicle 200 of FIG. 2. In some instances, the vehicle 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 302 may be a fully or partially autonomous vehicle having any other level or classification. Moreover, in some instances, the techniques described herein may be usable by non-autonomous vehicles as well.

The vehicle 302 can include vehicle computing device(s) 304, one or more sensor systems 306, one or more emitters 308, one or more communication connections 310, at least one direct connection 312 (e.g., for physically coupling the vehicle 302 to exchange data and/or to provide power), and one or more drive systems 314.

In some instances, the sensor(s) 306 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 808 may include multiple instances of each of these or other types of sensors. For instance, the LIDAR sensors may include individual LIDAR sensors located at the corners, front, back, sides, and/or top of the vehicle 302. As another example, the cameras may include multiple cameras disposed at various locations about the exterior and/or interior of the vehicle 302. The sensor(s) 306 may provide input to the vehicle computing device(s) 304.

The vehicle 302 may also include the emitter(s) 308 for emitting light and/or sound, as described above. The emitter(s) 308 in this example may include interior audio and visual emitter(s) to communicate with passengers of the vehicle 302. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 308 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 302 may also include the communication connection(s) 310 that enable communication between the vehicle 302 and one or more other local or remote computing device(s). For instance, the communication connection(s) 310 may facilitate communication with other local computing device(s) on the vehicle 302 and/or the drive system(s) 314. Also, the communication connection(s) 308 may additionally or alternatively allow the vehicle 302 to communicate with other nearby computing device(s) (e.g., other nearby vehicles, traffic signals, etc.). The communication connection(s) 310 may additionally or alternatively enable the vehicle 302 to communicate with a computing device 336.

The vehicle computing device(s) 304 can include one or more processors 316 and memory 318 communicatively coupled with the one or more processors 316. In the illustrated example, the memory 318 of the vehicle computing device(s) 304 stores a localization component 320, an onboard perception component 322 including a data association model 324 and a filtering model 326, one or more system controllers 328, and a planning component 330. Though depicted in FIG. 3 as residing in memory 318 for illustrative purposes, it is contemplated that the localization component 320, the perception component 322, the one or more system controllers 328, and/or the planning component 330 may additionally, or alternatively, be accessible to the vehicle 302 (e.g., stored remotely).

In some instances, the perception component 322 can include functionality to perform object detection, semantic segmentation, instance segmentation, and/or classification. In some examples, the perception component 322 can generate processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In at least one example, the vehicle computing device(s) 304 can include one or more system controllers 324, which can be configured to control steering, propulsion, braking, safety, emitters, communication, and other systems of the vehicle 302. The system controller(s) 324 can communicate with and/or control corresponding systems of the drive system(s) 314 and/or other components of the vehicle 302.

The system controller(s) 324 may be communicatively coupled to one or more sensors of the vehicle sensor system(s) 306. By way of non-limiting example, the sensors may detect the presence of objects in the environment of the vehicle and/or determine attributes of those objects. The system controller(s) 324 may also cause activation of a safety system of the vehicle 302 when it is determined that the safety system should be activated. For example, the system controller(s) 324 may instruct an airbag control unit to deploy one or more airbags, or may send a signal to a tensioner arranged to adjust tensioning of one or more restraints. Other safety systems are known and may be activated. In other embodiments, the system controller 324 may instruct activation of multiple safety systems. In some embodiments, some or all functionality of the system controller 324 may be performed remote from the vehicle 302, e.g., at a remote server associated with a dispatch or headquarters for the vehicle 302 or in the cloud. In other implementations, some or all of the functionality of the system controller(s) 324 may be performed at the vehicle 302 to minimize any delay that could result from the transmission of data between locales.

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 314. Furthermore, the drive system(s) 314 may also include one or more communication connection(s) that enable communication by the respective drive system with one or more other local or remote computing device(s).

In some examples, the vehicle 302 can send operational data, including raw or processed sensor data from the sensor system(s) 306, to one or more computing device(s) 336 via the network(s) 334. In other examples, the vehicle 302 can send processed operational data and/or representations of operational data to the computing device(s) 336 at a particular frequency, after a lapse of a predetermined period of time, in near real-time, etc. In some cases, the vehicle 302 can send raw or processed operational data to the computing device(s) 336 as one or more log files.

The one or more computing device(s) 336 can include one or more processors 338 and memory 340 communicatively coupled with the one or more processors 338. The memory 340 may store data defining an offline model 342 as described elsewhere in the present disclosure. The computing device(s) 336 may also include a user interface 346 for enabling user input relating to assisted labelling functionality as described elsewhere in the present disclosure.

In some instances, aspects of some or all of the components discussed herein may include any models, algorithms, and/or machine learning algorithms. For example, some of the component(s) in the memory 318 may be implemented as a neural network. As can be understood in the context of this disclosure, a neural network may be trained using machine learning in which values of parameters of the network may be determined automatically from data during a training process, rather than being explicitly programmed by a human programmer.

EXAMPLE CLAUSES

A: A system comprising: one or more processors; and one or more computer-readable media storing computer-executable instructions which, when executed by the one or more processors, cause the one or more processors to perform operations comprising: obtaining pointwise data indicating, for a plurality of time steps, a pointwise measurement of a state of an object detected by an object detection system onboard a vehicle; recursively processing, by a runtime model, the pointwise data to determine, for the plurality of time steps, a runtime estimate of the state of the object, wherein recursively processing by the runtime model comprises determining the runtime estimate of the state of the object at a first time step based on the pointwise measurement of the state of the object at the first time step and the runtime estimate of the state of the object at a second time step, wherein the second time step is earlier than the first time step; processing, by a benchmark model, the pointwise data to determine, for the plurality of time steps, a benchmark estimate of the state of the object, wherein the processing by the benchmark model comprises determining the benchmark estimate of the state of the object at the first time step based on the pointwise measurement of the state of the object at the first time step and at a plurality of further time steps, the plurality of further time steps including time steps later than the first time step; evaluating a metric measuring, for the plurality of time steps, a deviation between the runtime estimate and the benchmark estimate of the state of the object; and updating, based on the evaluation of the metric, the runtime model.

B: A system as described in clause A, configured to transmit data indicative of the updated runtime model to an autonomous vehicle via the data interface.

C: A system as described in clause A or B, wherein the state of the object comprises at least one of a position, velocity, yaw and yaw rate.

D: A system as described in any of clauses A to C, wherein processing the pointwise data using the benchmark model comprises: associating a first instance of the object detected at the first time step with respective further instances of the object detected at the plurality of further time steps, the associating comprising: determining a plurality of candidate track configurations comprising candidate groupings of instances of objects detected at the plurality of time steps; determining a most likely track configuration of the plurality of candidate track configurations; and associating the first instance of the object with said respective further instances of the object in accordance with the determined most likely track configuration.

E: A system as described in clause D, wherein the runtime model comprises one or more thresholds for controlling the associating of object instances detected at respective different time steps; and updating the runtime model comprises determining updated values for said one or more thresholds.

F: A computer-implemented method comprising: obtaining pointwise data indicating, for a plurality of time steps, a pointwise measurement of a state of an object detected by an object detection system; obtaining, from a runtime model, runtime data indicating, for the plurality of time steps, a runtime estimate of the state of the object; processing, by a benchmark model, the pointwise data to determine, for the plurality of time steps, a benchmark estimate of the state of the object; evaluating a metric measuring, for the plurality of time steps, a deviation between the runtime estimate and the benchmark estimate of the state of the object; and updating, based on the evaluation of the metric, the runtime model.

G: A computer-implemented method as described in clause F, comprising transmitting data indicative of the updated runtime model to an autonomous vehicle.

H: A computer-implemented method as described in clause F or G, wherein the state of the object comprises at least one of a position, velocity, yaw, and yaw rate.

I: A computer-implemented method as described in any of clauses F to H, wherein: the runtime model generates the runtime data using a recursive filter having an associated process noise covariance and an associated observation noise covariance; and updating the runtime model comprises updating at least one of the associated process noise covariance and the associated observation noise covariance.

J: A computer-implemented method as described in any of clauses F to I, comprising recursively processing, by the runtime mode, the pointwise data to determine, for the plurality of time steps, the runtime estimate of the state of the object, wherein recursively processing by the runtime model comprises determining the runtime estimate of the state of the object at a first time step based on the pointwise measurement of the state of the object at the first time step and the runtime estimate of the state of the object at a second time step, wherein the second time step is earlier than the first time step;

K: A computer-implemented method as described in any of clauses F to J, wherein the processing by the benchmark model comprises determining the benchmark estimate of the state of the object at a first time step based on the pointwise measurement of the state of the object at the first time step and at a plurality of further time steps, the plurality of further time steps comprising a time step later than the first time step.

L: A computer-implemented method as described in clause K, wherein the processing by the benchmark model comprises processing, by a smoother, the pointwise measurement of the state at the first time step and at the plurality of further time steps.

M: A computer-implemented method as described in clause K or L, wherein the processing by the benchmark model comprises associating a first instance of the object detected at the first time step with respective further instances of the object detected at the plurality of further time steps.

N: A computer-implemented method as described in clause M, wherein associating the first instance of the object detected at the first time step with the respective further instances of the object detected at the plurality of further time steps comprises: determining a plurality of candidate track configurations comprising candidate groupings of instances of objects detected at the plurality of time steps; determining a most likely track configuration of the plurality of candidate track configurations; and associating the first instance of the object with said respective further instances of the object in accordance with the determined most likely track configuration.

O: A computer-implemented method as described in clause N, comprising determining a respective likelihood value for each of the plurality of candidate track configurations, wherein determining the most likely track configuration comprises selecting a candidate track configuration determined to have the highest likelihood value.

P: A computer-implemented method as described in any of clauses L to N, wherein: the runtime model comprises one or more thresholds for controlling the associating of instances of the object detected at respective different time steps; and updating the runtime model comprises determining updated values for said one or more thresholds.

Q: A computer-implemented method as described in any of clauses F to P, wherein obtaining the pointwise data comprises receiving the pointwise data from a computer system onboard a vehicle.

R: A computer-implemented method as described in any of clauses F to Q, wherein the metric measures a divergence between a probability distribution associated with the runtime estimate of the object for the plurality of time steps and a probability distribution associated with the benchmark estimate of the kinematic state of the object for the plurality of time steps.

S: A computer-implemented method as described in any of clauses F to R, comprising obtaining ground truth data indicating, for the plurality of time steps, a ground truth value of the state of the object, wherein the metric measures the deviation between the runtime estimate of the state of the object and the benchmark estimate of the state of the object by reference to the ground truth value of the state of the object.

T: One or more non-transitory computer-readable media storing instructions executable by one or more processors, wherein the instructions, when executed, cause the one or more processors to perform operations comprising: obtaining pointwise data indicating, for a plurality of time steps, a pointwise measurement of a state of an object detected by an object detection system; obtaining, from a runtime model, runtime data indicating, for the plurality of time steps, a runtime estimate of the state of the object; processing, by a benchmark model, the pointwise data to determine, for the plurality of time steps, a benchmark estimate of the state of the object; evaluating a metric measuring, for the plurality of time steps, a deviation between the runtime estimate and the benchmark estimate of the state of the object; and updating, based on the evaluation of the metric, the runtime model.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
   one or more processors; and
   one or more non-transitory computer-readable media storing computer-executable instructions which, when executed by the one or more processors, cause the one or more processors to perform operations comprising:
   receiving, from an object detection system comprising one or more sensors onboard a vehicle, pointwise data indicating, for a plurality of time steps, a pointwise measurement of a state of an object detected by the object detection system;
   recursively processing, by a runtime model that comprises a data association model and a recursive filter, and that uses parameter values to control the data association model and the recursive filter, the pointwise data to determine, for the plurality of time steps, a runtime estimate of the state of the object, wherein recursively processing by the runtime model comprises determining the runtime estimate of the state of the object at a first time step by processing, using the recursive filter, the pointwise measurement of the state of the object at the first time step and the runtime estimate of the state of the object at a second time step, wherein the second time step is earlier than the first time step;
   processing, by a benchmark model, the pointwise data to determine, for the plurality of time steps, a benchmark estimate of the state of the object, wherein the processing by the benchmark model comprises determining the benchmark estimate of the state of the object at the first time step based on the pointwise measurement of the state of the object at the first time step and at a plurality of further time steps, the plurality of further time steps including time steps later than the first time step;
   evaluating a metric measuring, for the plurality of time steps, a deviation between the runtime estimate and the benchmark estimate of the state of the object;
   updating, based on the evaluation of the metric, the runtime model, wherein the updating comprises adjusting at least one of the parameter values in a manner to reduce a value of the metric; and
   configuring an autonomous vehicle with the updated runtime model, the updated runtime model being for use in controlling the autonomous vehicle,
   wherein the configuring comprises configuring the autonomous vehicle to estimate states of objects in a vicinity of the autonomous vehicle using the updated runtime model and data captured by sensors onboard the autonomous vehicle.

2. The system of claim 1, configured to transmit data indicative of the updated runtime model to the autonomous vehicle via a data interface.

3. The system of claim 1, wherein the state of the object comprises at least one of a position, velocity, yaw and yaw rate.

4. The system of claim 1, wherein the processing by the benchmark model comprises associating a first instance of the object detected at the first time step with respective further instances of the object detected at the plurality of further time steps, the associating comprising:
   determining a plurality of candidate track configurations comprising candidate groupings of instances of objects detected at the plurality of time steps;
   determining a most likely track configuration of the plurality of candidate track configurations; and associating the first instance of the object with said respective further instances of the object in accordance with the determined most likely track configuration.

5. The system of claim 4, wherein:
the runtime model comprises one or more thresholds for controlling the associating of object instances detected at respective different time steps; and
updating the runtime model comprises determining updated values for said one or more thresholds.

6. A computer-implemented method comprising:
receiving, from an object detection system comprising one or more sensors onboard a vehicle, pointwise data indicating, for a plurality of time steps, a pointwise measurement of a state of an object detected by the object detection system;
recursively processing, by a runtime model that comprises a data association model and a noise filter, and that uses parameter values to control the data association model and the noise filter, the pointwise data to generate runtime data indicating, for the plurality of time steps, a runtime estimate of the state of the object;
processing, by a benchmark model, the pointwise data to determine, for the plurality of time steps, a benchmark estimate of the state of the object;
evaluating a metric measuring, for the plurality of time steps, a deviation between the runtime estimate and the benchmark estimate of the state of the object; and
updating, based on the evaluation of the metric, the runtime model, wherein the updating comprises adjusting at least one of the parameter values in a manner to reduce a value of the metric; and
configuring an autonomous vehicle with the updated runtime model, the updated runtime model being for use in controlling the autonomous vehicle,
wherein the configuring comprises configuring the autonomous vehicle to estimate states of objects in a vicinity of the autonomous vehicle using the updated runtime model and data captured by sensors onboard the autonomous vehicle.

7. The computer-implemented method of claim 6, comprising transmitting data indicative of the updated runtime model to the autonomous vehicle.

8. The computer-implemented method of claim 6, wherein the state of the object comprises at least one of a position, velocity, yaw, and yaw rate.

9. The computer-implemented method of claim 6, wherein:
the recursive filter has an associated process noise covariance and an associated observation noise covariance; and
updating the runtime model comprises updating at least one of the associated process noise covariance and the associated observation noise covariance.

10. The computer-implemented method of claim 6, wherein the processing by the runtime model comprises determining the runtime estimate of the state of the object at a first time step by processing, using the recursive filter, the pointwise measurement of the state of the object at the first time step and the runtime estimate of the state of the object at a second time step, wherein the second time step is earlier than the first time step.

11. The computer-implemented method of claim 6, wherein the processing by the benchmark model comprises determining the benchmark estimate of the state of the object at a first time step based on the pointwise measurement of the state of the object at the first time step and at a plurality of further time steps, the plurality of further time steps comprising a time step later than the first time step.

12. The computer-implemented method of claim 11, wherein the processing by the benchmark model comprises processing, by a smoother, the pointwise measurement of the state at the first time step and at the plurality of further time steps.

13. The computer-implemented method of claim 11, wherein the processing by the benchmark model comprises associating a first instance of the object detected at the first time step with respective further instances of the object detected at the plurality of further time steps.

14. The computer-implemented method of claim 12, wherein associating the first instance of the object detected at the first time step with the respective further instances of the object detected at the plurality of further time steps comprises:
determining a plurality of candidate track configurations comprising candidate groupings of instances of objects detected at the plurality of time steps;
determining a most likely track configuration of the plurality of candidate track configurations; and
associating the first instance of the object with said respective further instances of the object in accordance with the determined most likely track configuration.

15. The computer-implemented method of claim 14, comprising determining a respective likelihood value for each of the plurality of candidate track configurations,
wherein determining the most likely track configuration comprises selecting a candidate track configuration determined to have the highest likelihood value.

16. The computer-implemented method of claim 13, wherein:
the runtime model comprises one or more thresholds for controlling the associating of object instances detected at respective different time steps; and
updating the runtime model comprises determining updated values for said one or more thresholds.

17. The computer-implemented method of claim 6, wherein the metric measures a divergence between a probability distribution associated with the runtime estimate of the state of the object for the plurality of time steps and a probability distribution associated with the benchmark estimate of the state of the object for the plurality of time steps.

18. The computer-implemented method of claim 6, comprising obtaining ground truth data indicating, for the plurality of time steps, a ground truth value of the state of the object,
wherein the metric measures the deviation between the runtime estimate and the benchmark estimate of the state of the object by reference to the ground truth value of the state of the object.

19. One or more non-transitory computer-readable media storing instructions executable by one or more processors, wherein the instructions, when executed, cause the one or more processors to perform operations comprising:
receiving, from an object detection system comprising one or more sensors onboard a vehicle, pointwise data indicating, for a plurality of time steps, a pointwise measurement of a state of an object detected by the object detection system;
recursively processing, by a runtime model that comprises a data association model and a recursive filter and that uses parameter values to control the data association model and the recursive filter, the pointwise data to generate runtime data indicating, for the plurality of time steps, a runtime estimate of the state of the object;

processing, by a benchmark model, the pointwise data to determine, for the plurality of time steps, a benchmark estimate of the state of the object;

evaluating a metric measuring, for the plurality of time steps, a deviation between the runtime estimate and the benchmark estimate of the state of the object; and updating, based on the on the evaluation of the metric, the runtime model, wherein the updating comprises adjusting at least one of the parameter values in a manner to reduce a value of the metric; and configuring an autonomous vehicle with the updated runtime model, the updated runtime model being for use in controlling the autonomous vehicle, wherein the configuring comprises configuring the autonomous vehicle to estimate states of objects in a vicinity of the autonomous vehicle using the updated runtime model and data captured by sensors onboard the autonomous vehicle.

\* \* \* \* \*